United States Patent
Hai

(10) Patent No.: US 12,517,388 B2
(45) Date of Patent: Jan. 6, 2026

(54) ARRAY SUBSTRATE AND MOBILE TERMINAL

(71) Applicant: SHENZHEN CHINA STAR OPTOELECTRONICS SEMICONDUCTOR DISPLAY TECHNOLOGY CO., LTD, Guangdong (CN)

(72) Inventor: Bo Hai, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 229 days.

(21) Appl. No.: 17/758,225

(22) PCT Filed: May 19, 2022

(86) PCT No.: PCT/CN2022/093817
§ 371 (c)(1),
(2) Date: Jun. 30, 2022

(87) PCT Pub. No.: WO2023/216292
PCT Pub. Date: Nov. 16, 2023

(65) Prior Publication Data
US 2024/0201526 A1     Jun. 20, 2024

(30) Foreign Application Priority Data
May 9, 2022   (CN) .......................... 202210498320.9

(51) Int. Cl.
G02F 1/13      (2006.01)
G02F 1/1343    (2006.01)

(52) U.S. Cl.
CPC ...... *G02F 1/1323* (2013.01); *G02F 1/134345* (2021.01); *G02F 1/13439* (2013.01)

(58) Field of Classification Search
None
See application file for complete search history.

(56) References Cited

U.S. PATENT DOCUMENTS 9,110,335 B2 * 8/2015 Kang .................... G02F 1/1336
9,846,327 B2 * 12/2017 Huh ................. G02F 1/133512
(Continued)

FOREIGN PATENT DOCUMENTS

| CN | 102707519 A | 10/2012 |
| CN | 107656650 A | 2/2018 |

(Continued)

OTHER PUBLICATIONS

International Search Report in International application No. PCT/CN2022/093817, mailed on Dec. 19, 2022.
(Continued)

*Primary Examiner* — Ryan Crockett
(74) *Attorney, Agent, or Firm* — PV IP PC; Wei Te Chung

(57) ABSTRACT

An array substrate and a mobile terminal are disclosed. In the array substrate, a grayscale value of a first color displayed by a first sub-pixel unit and a grayscale value of a second color displayed by a second sub-pixel unit are greater than a grayscale value of a third color displayed by a third sub-pixel unit. An acute angle between a first branch electrode of the first sub-pixel unit and a horizontal visual axis and an acute angle between a second branch electrode of the second sub-pixel unit and the horizontal visual axis are less than an acute angle between a third branch electrode of the third sub-pixel unit and the horizontal visual axis.

18 Claims, 6 Drawing Sheets

(56) References Cited

U.S. PATENT DOCUMENTS

| | | | |
|---|---|---|---|
| 11,314,131 B2* | 4/2022 | Cho | G02F 1/136286 |
| 11,644,721 B2* | 5/2023 | Chen | G02F 1/134336 |
| | | | 349/56 |
| 2013/0314640 A1* | 11/2013 | Kang | G02F 1/13363 |
| | | | 349/96 |
| 2016/0011458 A1* | 1/2016 | Xu | G02F 1/133514 |
| | | | 438/35 |
| 2016/0202533 A1 | 7/2016 | Im et al. | |
| 2017/0160584 A1* | 6/2017 | Song | G02F 1/133514 |
| 2021/0011318 A1 | 1/2021 | He | |
| 2021/0225301 A1 | 7/2021 | Yang | |
| 2021/0294165 A1* | 9/2021 | Zhang | G02F 1/133514 |

FOREIGN PATENT DOCUMENTS

| | | |
|---|---|---|
| CN | 109283756 A | 1/2019 |
| CN | 110955085 A | 4/2020 |
| CN | 111538191 A | 8/2020 |
| CN | 113703232 A | 11/2021 |
| CN | 214896134 U | 11/2021 |
| JP | 2010008874 A | 1/2010 |
| JP | 2010281926 A | 12/2010 |
| JP | 2013254121 A | 12/2013 |

OTHER PUBLICATIONS

Written Opinion of the International Search Authority in International application No. PCT/CN2022/093817, mailed on Dec. 19, 2022.
Korean Office Action issued in corresponding Korean Patent Application No. 10-2022-7025835 dated Sep. 18, 2023, pp. 1-6.
Chinese Office Action issued in corresponding Chinese Patent Application No. 202210498320.9 dated Apr. 25, 2023, pp. 1-8.
Japanese Office Action issued in corresponding Japanese Patent Application No. 特願2022-542671 dated Oct. 1, 2024, pp. 1-4.
Japanese Office Action issued in corresponding Japanese Patent Application No. 特願2022-542671 dated Mar. 25, 2025, pp. 1-5.

* cited by examiner

ARRAY SUBSTRATE AND MOBILE TERMINAL

FIELD

The present disclosure relates to a field of display technologies, and more particularly, to an array substrate and a mobile terminal.

BACKGROUND

Nowadays, flat display devices, such as liquid crystal displays, dominate a flat display device market because they have characteristics such as small size, light weight, small thickness, low power consumption, and no radiation.

As usage scenarios become more and more diverse, liquid crystal display (LCD) panels include different display methods according to users' demands. When display panels are changed from a landscape mode to a portrait mode, a color shading issue may occur on the display panels because viewing angles are changed (from horizontal viewing angles to vertical viewing angles), resulting in a bad display effect of the display panels. Consequently, users may make a complaint because their experiences are affected.

SUMMARY

Embodiments of the present disclosure provide an array substrate and a mobile terminal to solve a following issue: when display panels are changed from a landscape mode to a portrait mode, a color shading issue may occur on the display panels because viewing angles are changed (from horizontal viewing angles to vertical viewing angles).

To solve the above issue, technical solutions provided by the present disclosure are described as follows.

An embodiment of the present disclosure provides an array substrate, comprising:
- a plurality of sub-pixel units, wherein the pixel units comprise a plurality of first sub-pixel units displaying a first color, a plurality of second sub-pixel units displaying a second color, and a plurality of third sub-pixel units displaying a third color, the first color, the second color, and the third color are different, a grayscale value of the first color and a grayscale value of the second color both are greater than a grayscale value of the third color;
- the array substrate comprises a pair of short edges parallel to a horizontal visual axis and a pair of long edges vertical to the horizontal visual axis;
- the first sub-pixel units comprise a first pixel electrode, the first pixel electrode comprises at least two first branch electrodes, the first branch electrodes extend along a first direction, and an acute angle between the first direction and the horizontal visual axis is a first angle;
- the second sub-pixel units comprise a second pixel electrode, the second pixel electrode comprises at least two second branch electrodes, the second branch electrodes extend along a second direction, and an acute angle between the second direction and the horizontal visual axis is a second angle;
- the third sub-pixel units comprise a third pixel electrode, the third pixel electrode comprises at least two third branch electrodes, the third branch electrodes extend along a third direction, and an acute angle between the third direction and the horizontal visual axis is a third angle; and wherein the first angle is less than the third angle, and the second angle is less than the third angle.

In one embodiment, the first angle and/or the second angle are/is greater than or equal to 45°, and the third angle is greater than 45°.

In one embodiment, the first angle and/or the second angle are/is less than or equal to 60°, and the third angle is less than or equal to 65°.

In one embodiment, a difference between the first angle and the third angle is greater than 0.1° and is less than or equal to 10°; and/or
  a difference between the second angle and the third angle is greater than 0.1° and is less than or equal to 10°.

In one embodiment, the difference between the first angle and the third angle is 5°, and the difference between the second angle and the third angle is 5°.

In one embodiment, the first angle is equal to the second angle.

In one embodiment, the first pixel electrodes comprise a first main stem electrode, the first main stem electrode is criss-cross-shaped, the first branch electrodes are connected to the first main stem electrode, each of the first sub-pixel units is divided into four pixel domains by the first main stem electrode, the first branch electrodes are separately disposed in the four pixel domains, the first branch electrodes disposed in the four pixel domains extend from an intersection center of the first main stem electrode in four different directions, and four acute angles between extension directions of the first branch electrodes disposed in the four pixel domains and the horizontal visual axis constitute a set of first angles;

the second pixel electrodes comprise a second main stem electrode, the second main stem electrode is criss-cross-shaped, the second branch electrodes are connected to the second main stem electrode, each of the second sub-pixel units is divided into four pixel domains by the second main stem electrode, the second branch electrodes are separately disposed in the four pixel domains, the second branch electrodes disposed in the four pixel domains extend from an intersection center of the second main stem electrode in four different directions, and four acute angles between extension directions of the second branch electrodes disposed in the four pixel domains and the horizontal visual axis constitute a set of second angles;

the third pixel electrodes comprise a third main stem electrode, the third main stem electrode is criss-cross-shaped, the third branch electrodes are connected to the third main stem electrode, each of the third sub-pixel units is divided into four pixel domains by the third main stem electrode, the third branch electrodes are separately disposed in the four pixel domains, the third branch electrodes disposed in the four pixel domains extend from an intersection center of the third main stem electrode in four different directions, and four acute angles between extension directions of the third branch electrodes disposed in the four pixel domains and the horizontal visual axis constitute a set of third angles; and any one of the third angles in the set of the third angles is greater than any one of the first angles in the set of the first angles, and any one of the third angles in the set of the third angles is greater than any one of the second angles in the set of the second angles.

In one embodiment, the third angles in the set of the third angles are equal, the second angles in the set of the second angles are equal, and the first angles in the set of the first angles are equal.

In one embodiment, the third angles in the set of the third angles are 55°, the first angles in the set of the first angles and the second angles in the set of the second angles are 50°.

In one embodiment, the first color and the second color comprise any one of red or green, and the third color comprises blue.

The present disclosure further provides a mobile terminal, comprising an array substrate and a main terminal body, and the array substrate and the main terminal body are integrated;

wherein the array substrate comprises:
a plurality of sub-pixel units, wherein the pixel units comprise a plurality of first sub-pixel units displaying a first color, a plurality of second sub-pixel units displaying a second color, and a plurality of third sub-pixel units displaying a third color, the first color, the second color, and the third color are different, a grayscale value of the first color and a grayscale value of the second color both are greater than a grayscale value of the third color;
the array substrate comprises a pair of short edges parallel to a horizontal visual axis and a pair of long edges vertical to the horizontal visual axis;
the first sub-pixel units comprise a first pixel electrode, the first pixel electrode comprises at least two first branch electrodes, the first branch electrodes extend along a first direction, and an acute angle between the first direction and the horizontal visual axis is a first angle;
the second sub-pixel units comprise a second pixel electrode, the second pixel electrode comprises at least two second branch electrodes, the second branch electrodes extend along a second direction, and an acute angle between the second direction and the horizontal visual axis is a second angle;
the third sub-pixel units comprise a third pixel electrode, the third pixel electrode comprises at least two third branch electrodes, the third branch electrodes extend along a third direction, and an acute angle between the third direction and the horizontal visual axis is a third angle; and
wherein the first angle is less than the third angle, and the second angle is less than the third angle.

In one embodiment, the first angle and/or the second angle are/is greater than or equal to 45°, and the third angle is greater than 45°.

In one embodiment, the first angle and/or the second angle are/is less than or equal to 60°, and the third angle is less than or equal to 65°.

In one embodiment, a difference between the first angle and the third angle is greater than 0.1° and is less than or equal to 10°; and/or
a difference between the second angle and the third angle is greater than 0.1° and is less than or equal to 10°.

In one embodiment, the difference between the first angle and the third angle is 5°, and the difference between the second angle and the third angle is 5°.

In one embodiment, the first angle is equal to the second angle.

In one embodiment, the first pixel electrodes comprise a first main stem electrode, the first main stem electrode is criss-cross-shaped, the first branch electrodes are connected to the first main stem electrode, each of the first sub-pixel units is divided into four pixel domains by the first main stem electrode, the first branch electrodes are separately disposed in the four pixel domains, the first branch electrodes disposed in the four pixel domains extend from an intersection center of the first main stem electrode in four different directions, and four acute angles between extension directions of the first branch electrodes disposed in the four pixel domains and the horizontal visual axis constitute a set of first angles;

the second pixel electrodes comprise a second main stem electrode, the second main stem electrode is criss-cross-shaped, the second branch electrodes are connected to the second main stem electrode, each of the second sub-pixel units is divided into four pixel domains by the second main stem electrode, the second branch electrodes are separately disposed in the four pixel domains, the second branch electrodes disposed in the four pixel domains extend from an intersection center of the second main stem electrode in four different directions, and four acute angles between extension directions of the second branch electrodes disposed in the four pixel domains and the horizontal visual axis constitute a set of second angles;

the third pixel electrodes comprise a third main stem electrode, the third main stem electrode is criss-cross-shaped, the third branch electrodes are connected to the third main stem electrode, each of the third sub-pixel units is divided into four pixel domains by the third main stem electrode, the third branch electrodes are separately disposed in the four pixel domains, the third branch electrodes disposed in the four pixel domains extend from an intersection center of the third main stem electrode in four different directions, and four acute angles between extension directions of the third branch electrodes disposed in the four pixel domains and the horizontal visual axis constitute a set of third angles; and any one of the third angles in the set of the third angles is greater than any one of the first angles in the set of the first angles, and any one of the third angles in the set of the third angles is greater than any one of the second angles in the set of the second angles.

In one embodiment, the third angles in the set of the third angles are equal, the second angles in the set of the second angles are equal, and the first angles in the set of the first angles are equal.

In one embodiment, the third angles in the set of the third angles are 55°, the first angles in the set of the first angles and the second angles in the set of the second angles are 50°.

In one embodiment, the first color and the second color comprise any one of red or green, and the third color comprises blue.

Regarding the beneficial effects:
an array substrate provided by the present disclosure includes a plurality of sub-pixel units having three different display colors. In a same display state, a grayscale value of a first sub-pixel unit, a grayscale value of a second sub-pixel unit, and a grayscale value of a third sub-pixel units are different. An acute angle between a first electrode of the first sub-pixel unit and a horizontal visual axis is a first angle, an acute angle between a second electrode of the second sub-pixel unit and the horizontal visual axis is a second angle, and an acute angle between a third electrode of the third sub-pixel unit and the horizontal visual axis is a third angle. The first angle is controlled to be less than the third angle, the second angle is controlled to be less than the third angle, and extension directions of electrodes of the three sub-pixel units are respectively adjusted. Therefore, a plurality of branch electrodes of the sub-pixel units having poor viewing angles can be targetedly adjusted as much as possible, thereby achieving a great improvement effect of luminescence of the sub-pixel units having three different display colors as well as optimizing vertical viewing angles of the sub-pixel units as much as possible. As such, a color shading degree can be adjusted, and a color shading issue of display panels viewed at vertical viewing angles can be solved.

DETAILED DESCRIPTION

The present disclosure provides an array substrate and a mobile terminal. Embodiments are further described below in detail with reference to accompanying drawings to make objectives, technical solutions, and effects of the present disclosure clearer and more precise. It should be noted that described embodiments are merely used to construct the present disclosure and are not intended to limit the present disclosure.

Figure 1A:
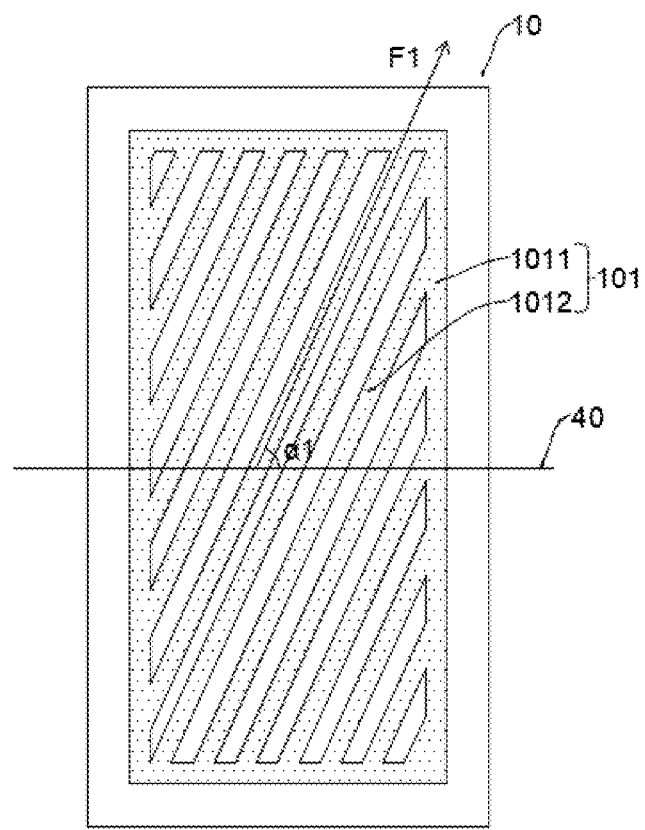
FIG. 1a is a structural schematic view showing a single-domain first sub-pixel unit provided by an embodiment of the present disclosure.
Figure 1B:
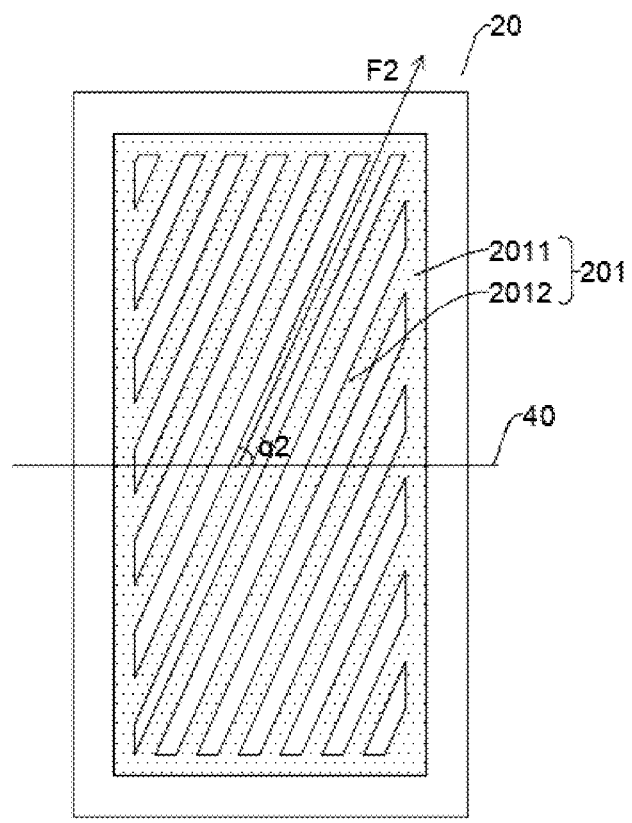
FIG. 1b is a structural schematic view showing a single-domain second sub-pixel unit provided by the embodiment of the present disclosure.
Figure 1C:
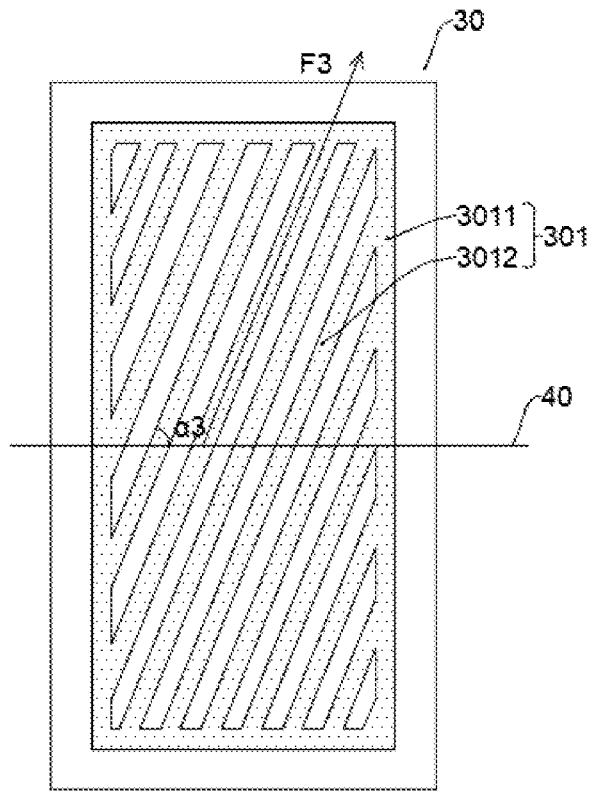
FIG. 1c is a structural schematic view showing a single-domain third sub-pixel unit provided by the embodiment of the present disclosure.

An embodiment of the present disclosure provides an array substrate, as shown in FIG. 1a to FIG. 1c, including:

a plurality of sub-pixel units, wherein the pixel units include a plurality of first sub-pixel units 10 displaying a first color, a plurality of second sub-pixel units 20 displaying a second color, and a plurality of third sub-pixel units 30 displaying a third color. The first color, the second color, and the third color are different, and a grayscale value of the first color and a grayscale value of the second color are greater than a grayscale value of the third color in a same display state.

The array substrate includes a pair of short edges a parallel to a horizontal visual axis 40 and a pair of long edges b vertical to the horizontal visual axis 40.

The first sub-pixel units 10 include a first pixel electrode 101. The first pixel electrode 101 includes at least two first branch electrodes 1012. The first branch electrodes 1012 extend along a first direction F1, and an acute angle between the first direction F1 and the horizontal visual axis 40 is a first angle α1.

The second sub-pixel units 20 include a second pixel electrode 201. The second pixel electrode 201 includes at least two second branch electrodes 2012. The second branch electrodes 2012 extend along a second direction F2, and an acute angle between the second direction F2 and the horizontal visual axis 40 is a second angle α2.

The third sub-pixel units 30 include a third pixel electrode 301. The third pixel electrode 301 includes at least two third branch electrodes 3012. The third branch electrodes 3012 extend along a third direction F3, and an acute angle between the third direction F2 and the horizontal visual axis 40 is a third angle α3.

The first angle α1 is less than the third angle α3, and the second angle α2 is less than the third angle α3.

It should be noted that the array substrate of the present disclosure and a color filter substrate will be assembled to form a display panel which is a terminal product. The display panel may be a liquid crystal display (LCD) panel. Specifically, the display panel may be a vertical alignment (VA) LCD panel. The assembled terminal product is the LCD panel which is taken as an example to describe the present embodiment.

Figure 3:
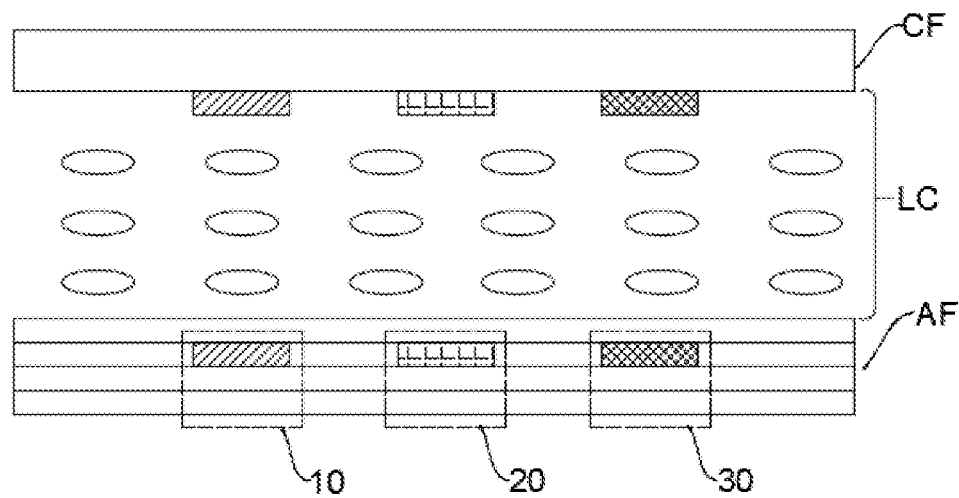
FIG. 3 is a structural schematic view showing the display panel assembled from the array substrate provided by the embodiment of the present disclosure.

As shown in FIG. 3, the LCD panel includes a color filter substrate CF and a thin-film transistor (TFT) array substrate AF arranged opposite to each other, and a liquid crystal layer LC arranged between the TFT substrate and the color filter substrate CF. The color filter substrate CF includes a red color resist, a green color resist, and a blue color resist.

The array substrate AF includes a plurality of sub-pixel units, and one of the sub-pixel units corresponds to one of the color resists disposed on a color filter substrate CF.

Specifically, the first color, the second color, and the third color include, but are not limited to, any combinations of red (R), green (G), and blue (B). In a same display state, a grayscale value of the first color and a grayscale value of the second color are greater than a grayscale value of the third color.

In the present embodiment, the first color is red, the second color is green, and the third color is blue. That is, the first sub-pixel unit 10 corresponds to a red color resist, the second sub-pixel unit 20 corresponds to a green color resist, and the third sub-pixel unit 30 corresponds to the blue color resist.

It should be noted that, in the array substrate provided by the embodiment of the present disclosure, the first pixel electrode 101 of the first sub-pixel units 10, the second pixel electrode 201 of the second sub-pixel units 20, and the third sub-pixel unit 30 of the third pixel electrode 301 may have a single-domain structure, a double-domain structure, or a multi-domain structure, and are not limited in the present embodiment.

For example, as shown in FIG. 1a, the first sub-pixel units 10 include a main trunk electrode, which is a shield electrode in a single-domain structure, and at least two first branch electrodes 1012 connected to the main trunk electrode, extension directions of the two first branch electrodes 1012 are same and both extend along the first direction F1. The acute angle between the first direction F1 and the horizontal visual axis 40 is the first angle α1.

For example, as shown in FIG. 1b, the second sub-pixel units 20 include a main trunk electrode, which is a shield electrode in a single-domain structure, and at least two second branch electrodes 2012 connected to the main trunk electrode, extension directions of the two second branch electrodes 2012 are same and both extend along the second direction F2. The acute angle between the second direction F2 and the horizontal visual axis 40 is the second angle α2.

For example, as shown in FIG. 1c, the third sub-pixel units 10 include a main trunk electrode, which is a shield electrode in a single-domain structure, and at least two third branch electrodes 3012 connected to the main trunk electrode, extension directions of the two third branch electrodes 3012 are same and both extend along the third direction F3. The acute angle between the third direction F3 and the horizontal visual axis 40 is the third angle α3.

Taking a display panel displaying different skin tones (the skin tones are mixed color) as an example, when an LCD panel displays, the skin tones are composed of sub-pixels having three colors R, G, and B. A difference therebetween is that the sub-pixels having three colors of R, G, and B have different grayscale values and display different skin tones. According to the above principle, when improving viewing angles, the three sub-pixels in different grayscales need different degrees of improvement. Commonly, among the three colors of the mixture color, a sub-pixel unit that displays blue is a low-grayscale sub-pixel unit. The low-grayscale sub-pixel unit that displays blue has worse viewing angle characteristics in VA LCD panel. That is, a color of an image displayed by the display panel viewed from a front side and a color of the image displayed by the display panel viewed from a lateral side are very different).

Users may watch a display image displayed by display panels at different viewing angles. When the display panel is viewed from a right front side and a visual line is vertical to the display panel, a color shading issue will not happen. When the display panel is viewed from a lateral side instead of from the right front side, a color shading issue will happen. When lateral viewing angles range from 0° to 90° (endpoints are excluded), a greater the lateral viewing angles, a more serious a color shading issue occurring on the display panel.

Figure 2:
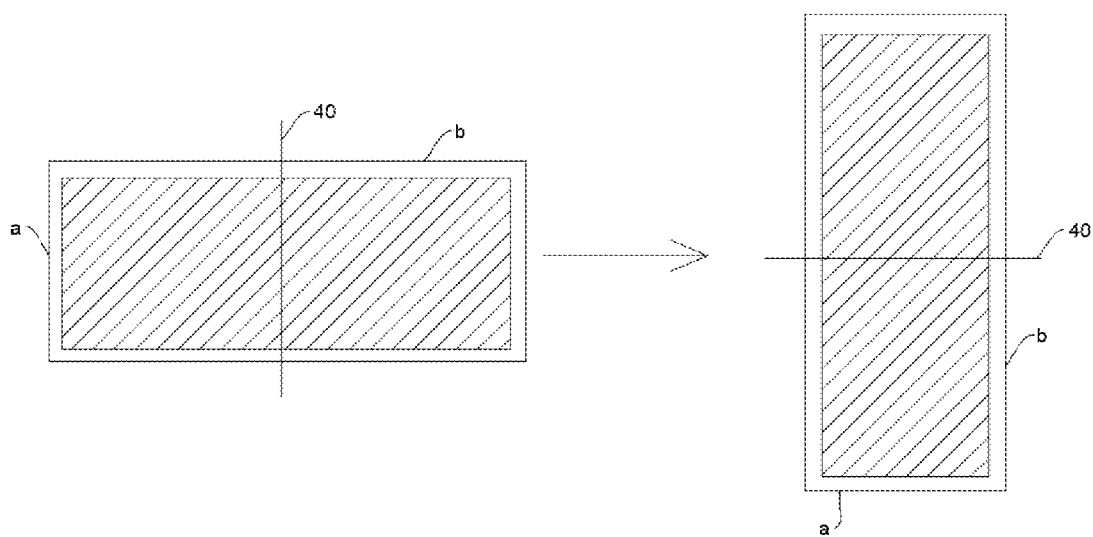
FIG. 2 is a schematic view showing a method of using a display panel assembled from an array substrate provided by an embodiment of the present disclosure.

The array substrate of the present disclosure is rectangular. The array substrate includes a pair of short edges a and a pair of long edges b. Commonly, when the display panel is in a landscape mode, the long edges b are horizontal, and the short edges a are vertical, as shown in FIG. 2. However, in some usage scenarios, it is necessary to change a usage mode of the display panel. The long edges b are changed to be vertical and the short edges a are changed to be horizontal, and the display panel is in a portrait mode, as shown in FIG. 2. Although users' viewing angles do not change, the display panel is changed from the landscape mode to the portrait mode. Therefore, a visible length of the display panel viewed at vertical viewing angles is changed (the original short edges a becomes the long edge b), and a color shading issue will happen under vertical viewing angles. As such, in the present disclosure, a structure of the sub-pixel units of the array substrate corresponding to the display panel is adjusted, and an angle between a branch electrode of a pixel electrode of the sub-pixel units and the horizontal visual axis 40 is adjusted, so that the color shift issue of the display panel viewed at vertical viewing angles is improved.

Specifically, the horizontal viewing axis 40 is parallel to the short edges a of the display panel and is perpendicular to the long edges b.

Specifically, the first angle α1 is less than the third angle α3, and the second angle α2 is less than the third angle α3, so that an angle between a branch electrode of the sub-pixel units having a low grayscale value and the horizontal visual axis 40 can be adjusted individually. Therefore, the angle between the branch electrode of the sub-pixel units having a low grayscale value and the horizontal visual axis 40 can be differentiated from angles between branch electrodes of the sub-pixel units having other grayscale value and the horizontal visual axis 40, thereby achieving a great improvement effect of a grayscale when three types of the sub-pixel units emit light.

It should be understood that the array substrate includes three types of sub-pixel units displaying different colors. In a same display state, a grayscale value displayed by the first sub-pixel unit 10, a grayscale value displayed by the second sub-pixel unit 20, and a grayscale value displayed by the third sub-pixel unit 30 are different. An acute angle between a first electrode P1 of the first sub-pixel units and the horizontal visual axis 40 is the first angle α1. An acute angle between a second electrode P2 of the second sub-pixel units and the horizontal visual axis 40 is the second angle α2. An acute angle between a third electrode P3 of the third sub-pixel units and the horizontal visual axis 40 is the third angle α3. The first angle α1 is controlled to be less than the third angle α3, the second angle α2 is controlled to be less than the third angle α3, and extensions direction of electrodes of the three sub-pixel units are respectively adjusted.

In one embodiment, the first angle α1 and/or the second angle α2 is greater than or equal to 45°, and the third angle α3 is greater than 45°. Therefore, a plurality of branch electrodes of the sub-pixel units having poor viewing angles can be targetedly adjusted as much as possible, thereby achieving a great improvement effect of luminescence of the sub-pixel units having three different display colors as well as achieving a great optimization degree of vertical viewing angles of the sub-pixel units. As such, a color shading degree can be adjusted, and a color shading issue of display panels viewed at vertical viewing angles can be solved.

In one embodiment, the first angle α1 and/or the second angle α2 are/is greater than or are/is equal to 45°, and the third angle α3 is greater than 45°.

Specifically, when an acute angle between branch electrodes and the horizontal viewing axis 40 is 45°, an image displayed by the display panel is even no matter the image is viewed from a lateral side or a right front side. (even if a color shading issue occurs, a color shading degree of the display panel viewed from the lateral side and a color shading degree of the display panel viewed from the right front side are same as long as lateral viewing angles are equal.). When the acute angle is greater than 45°, an arrangement direction of the branch electrodes of the pixel electrodes in the sub-pixel units is closer to a vertical viewing angle of the display panel (compared to a horizontal viewing angle).

It should be understood that the first angle α1 and/or the second angle α2 are/is controlled to be greater than or equal to 45°, and the third angle α3 is controlled to be greater than 45°. Therefore, an image displayed by the display panel viewed from a lateral side and having relatively a low color shading degree can be closer to the image displayed by the display panel viewed from a right front side. As such, a color shading issue of the display panel viewed at vertical viewing angles can be solved to a certain extent. Furthermore, because the third angle α3 is greater than the first angle α1 and the second angle α2, a color shading degree of the third sub-pixel unit 30 is targetedly adjusted with respect to a color shading degree of the first sub-pixel units 10 and a color shading degree of the second sub-pixel unit 20. Therefore, vertical viewing angles of the sub-pixel units can be optimized as much as possible.

In an embodiment, the first angle α1 and/or the second angle α2 are/is less than or equal to 60°, and the third angle α3 is less than or equal to 65°.

Specifically, when an acute angle between branch electrodes and the horizontal viewing axis 40 is 45°, an image displayed by the display panel is even no matter the image is viewed from a lateral side or a right front side. (even if a color shading issue occurs, a color shading degree of the display panel viewed from the lateral side and a color shading degree of the display panel viewed from the right front side are same as long as lateral viewing angles are equal.). By making the first angle α1 and/or the second angle α2 are/is less than or equal to 60°, arrangements of branch electrodes of the array substrate are much closer to closer to a vertical viewing angle of the display panel, and the display panel can still be used normally when the display panel is viewed at horizontal viewing angles. Furthermore, if the acute angle between the branch electrodes and the horizontal viewing axis 40 is far away from 45°, transmittance of the sub-pixels will be reduced, affecting a display effect of the display panel.

Specifically, according to the above ranges, a difference between the first angle α1 and the third angle α3 is greater than 0.1° and is less than or equal to 20°, and a difference between the second angle α2 and the third angle α3 is greater than 0.1° and is less than or equal to 20°.

By making the first angle α1 and/or the second angle α2 less than or equal to 600 and making the third angle α3 less than or equal to 65°, a color shading issue of the display panel viewed at vertical viewing angles can be solved without affecting transmittance of the display panel. As such, a display effect of the display panel can be prevented from being reduced.

In one embodiment, a difference between the first angle α1 and the third angle α3 is greater than 0.1° and is less than or equal to 10°; and/or a difference between the second angle α2 and the third angle α3 is greater than 0.1° and is less than or equal to 10°.

Specifically, to prevent a color shading issue from occurring on a white image mixed from red light, green light, and blue light emitted by three types of the sub-pixels, differences between the first angle α1, the second angle α2, and the three angle α3 are further controlled to be within a range of 0.1° to 10°, (endpoints are included).

By controlling the difference between the first angle α1, the second angle α2, and the third angle α3 to be within the range of 0.1° to 10°, a color shading degree of the display panel assembled from the array substrate viewed at vertical viewing angles can be reduced In one embodiment, a difference between the first angle α1 and the third angle α1 is 5°, and a difference between the second angle α2 and the third angle α3 is 5°.

Specifically, in a preferred embodiment, the difference is 5°. Experimental comparison data of color shading adjustment effects of the preferred embodiment and a conventional technology are as shown below.

In one embodiment, the first angle α1 is equal to the second angle α2.

Specifically, the first angle α1 and the second angle α2 can be greater than or equal to 45°, or can be less than or equal to 60°.

It should be understood that because a grayscale value of a color displayed by the first sub-pixel units 10 and a grayscale value of a color displayed by the second sub-pixel units 20 are not very different, making the first angle α1 equal to the second angle α2 can further simplifying manufacturing processes and reducing difficulty of manufacturing the array substrate.

In one embodiment, the first pixel units 101 include a criss-cross-shaped first main trunk electrode 1011. The first branch electrode 1012 are connected to the first main trunk electrode 1011. Each of the first sub-pixel units 10 is divided into four pixel domains by the first main trunk electrode 1011. The first branch electrodes 1012 are separately disposed in the four pixel domains. The first branch electrodes 1012 disposed in the four pixel domains extend from an intersection center of the first main trunk electrode 1011 in four different directions. Four acute angles between extension directions of the first branch electrodes 1012 disposed in the four pixel domains and the horizontal visual axis 40 constitute a set of the first angles;

The second pixel units 201 include a criss-cross-shaped second main trunk electrode 1011. The second branch electrode 2012 are connected to the second main trunk electrode 2011. Each of the second sub-pixel units 20 is divided into four pixel domains by the second main trunk electrode 2011. The second branch electrodes 2012 are separately disposed in the four pixel domains. The second branch electrodes 2012 disposed in the four pixel domains extend from an intersection center of the second main trunk electrode 2011 in four different directions. Four acute angles between extension directions of the second branch electrodes 2012 disposed in the four pixel domains and the horizontal visual axis 40 constitute a set of the second angles.

The third pixel units 301 include a criss-cross-shaped third main trunk electrode 3011. The third branch electrode 3012 are connected to the third main trunk electrode 3011. Each of the third sub-pixel units 30 is divided into four pixel domains by the third main trunk electrode 3011. The third branch electrodes 3012 are separately disposed in the four pixel domains. The third branch electrodes 3012 disposed in the four pixel domains extend from an intersection center of the third main trunk electrode 3011 in four different directions. Four acute angles between extension directions of the third branch electrodes 3012 disposed in the four pixel domains and the horizontal visual axis 40 constitute a set of the third angles.

Figure 4A:
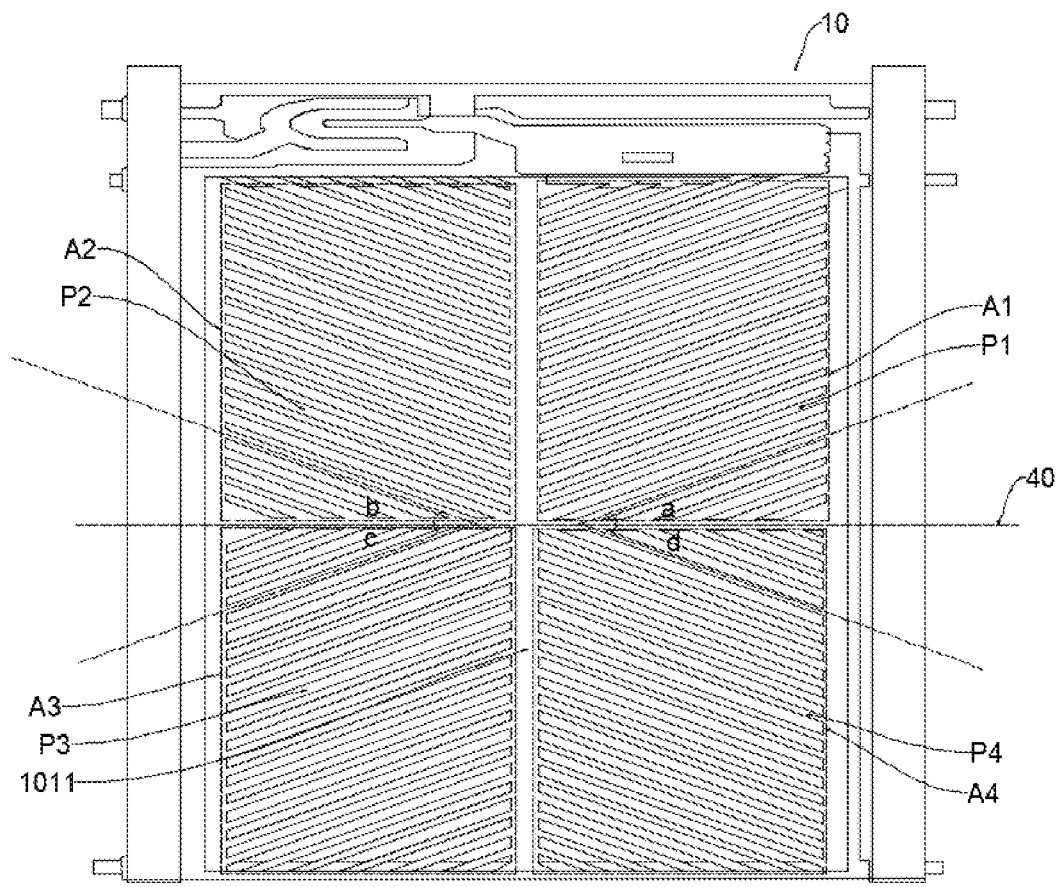
FIG. 4a is a structural schematic view showing a four-domain first sub-pixel unit provided by an embodiment of the present disclosure.
Figure 4B:
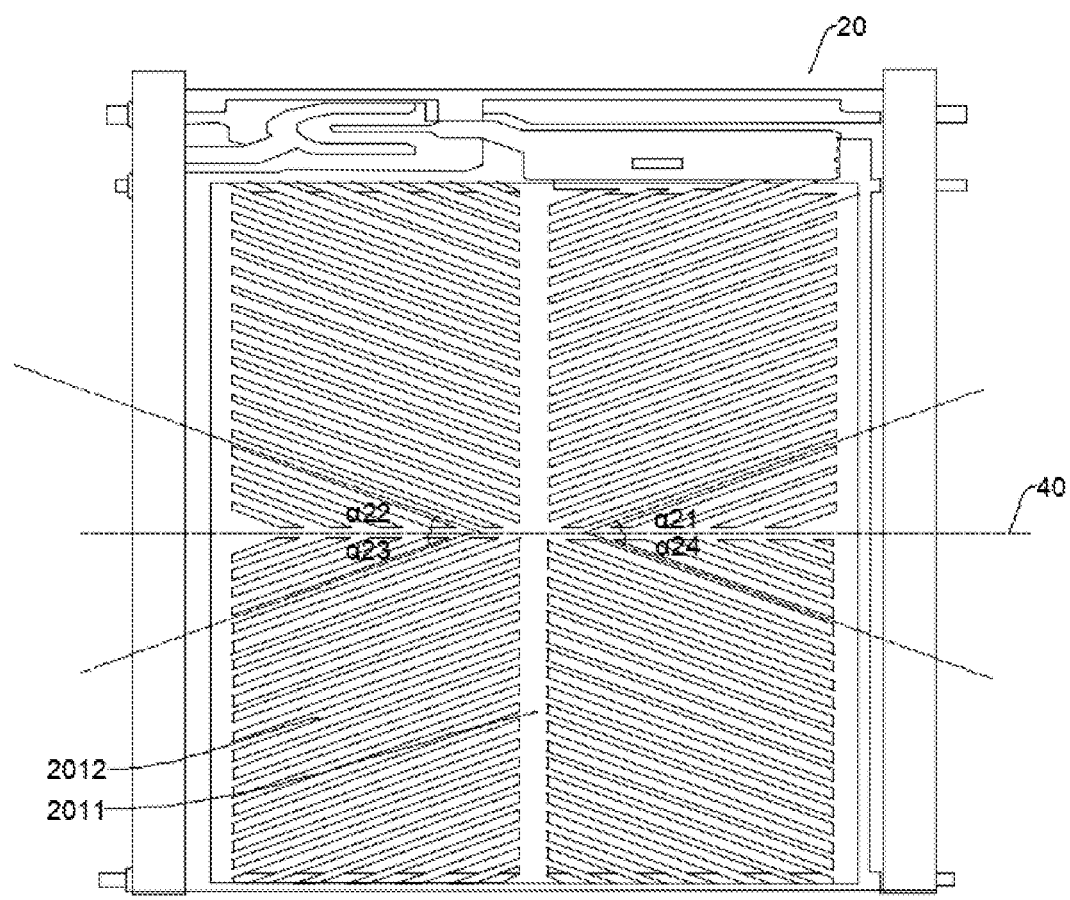
FIG. 4b is a structural schematic view showing a four-domain second sub-pixel unit provided by an embodiment of the present disclosure.
Figure 4C:
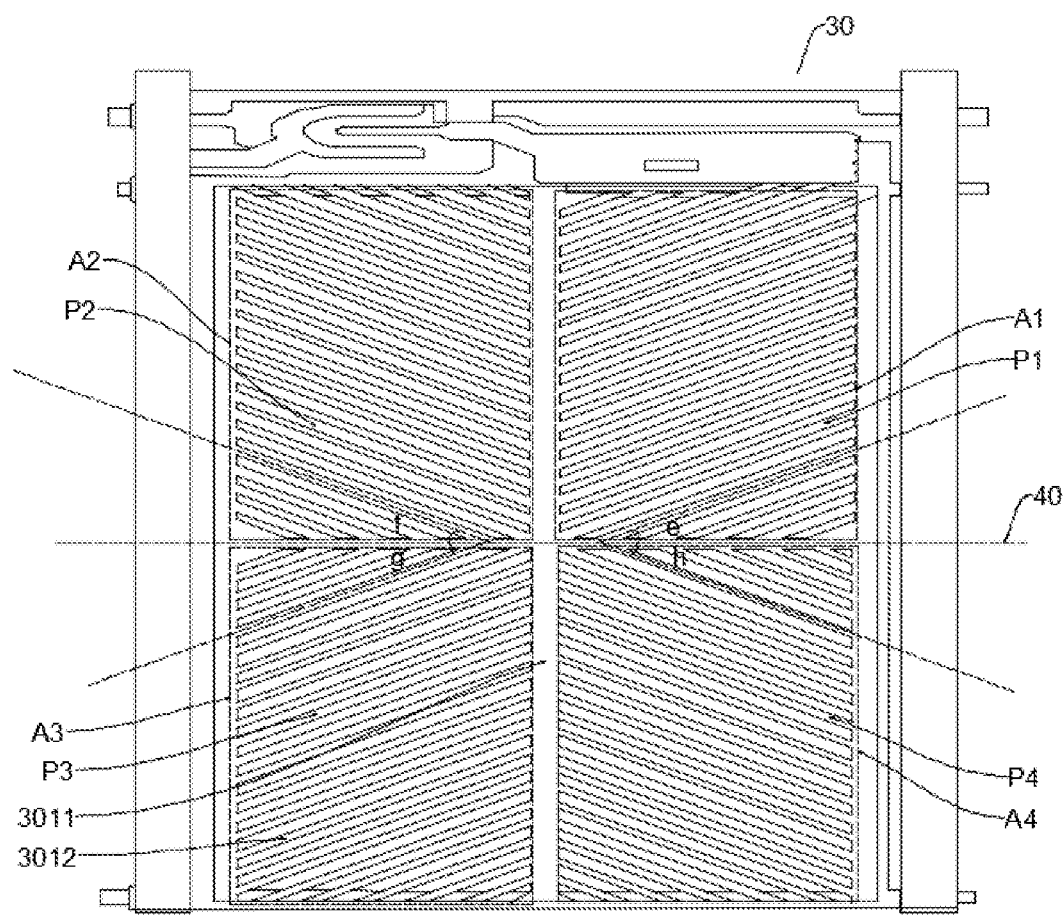
FIG. 4c is a structural schematic view showing a four-domain second sub-pixel unit provided by an embodiment of the present disclosure.

Any one of the third angles α3 in the set of the third angles α3 is greater than any one of the first angles α1 in the set of the first angles α1. Any one of the third angles α3 in the set of the third angles α3 is greater than any one of the second angles α2 in the set of the second angles α2. Specifically, as shown in FIG. 4a, FIG. 4b, and FIG. 4c, the sub-pixel units of the present embodiments all have a four-domain structure. The first main trunk electrode 1011, the second main trunk electrode 2011, and the third main trunk electrode 3011 are criss-cross-shaped. The first main trunk electrode 1011 is disposed on a center of the first sub-pixel units 10, thereby dividing the first sub-pixel units 10 into four domains with an equal area. The second main trunk electrode 2011 disposed in the second sub-pixel units 20 and the third main trunk electrode 3011 disposed in the third sub-pixel units 30 and the first main trunk electrode 1011 have a same arrangement.

Specifically, in the first sub-pixel units, the first branch electrodes 1012 disposed in the four pixel domains have different extension directions (including four first sub-directions). A first direction F1 includes any one of the four first sub-directions. The second sub-pixel units 20, the third sub-pixel units 30, and the first sub-pixel units have a same structure. That is, a second direction F2 includes any one of four second sub-directions (the second branch electrodes

2012 disposed in the four pixel domains have different extension directions). A third direction F3 includes any one of four third sub-directions (the third branch electrodes 3012 disposed in the four pixel domains have different extension directions).

In one specific embodiment, as shown in FIG. 4a, FIG. 4b, and FIG. 4c, electrodes as shown in FIG. 4b and FIG. 4c and electrodes as shown in FIG. 4a have a similar arrangement. A main difference therebetween is that an inclined angle between branch electrodes disposed in each of domain areas and the horizontal visual axis 40 as shown in FIG. 4c and an inclined angle between branch electrodes disposed in each domain areas and the horizontal visual axis 40 as shown in FIG. 4a and FIG. 4b is different.

For example, in FIG. 4a, the first trunk electrode 1011 divides the first sub-pixel units 10 into four pixel domains, which are sequentially a first pixel domain A1, a second pixel domain A2, a third pixel domain A3, and a fourth pixel domain A4 in a counterclockwise order. The first branch electrodes 1012 in the four pixel domains are sequentially a first electrode P1, a second electrode P2, a third electrode P3, and a fourth electrode P4 in a counterclockwise order. The four electrodes respectively extend in four directions from an intersection of the first main trunk electrode 1011. The horizontal visual axis 40 is an X axis and a right extension direction of the horizontal visual axis 40 is a positive direction. An angle a between the first electrode P1 and the horizontal visual axis 40 ranges from 45° to 60° (an acute angle between the first electrode P1 and the horizontal visual axis 40 ranges from 45° to 60°). Specifically, the angle may be any one of 45°, 46°, 47° 48° 49° 50°, 51°, 52° 53° 54° 55° 56° 57° 58°, 59°, or 60°.

An angle b between the second electrode P2 and the horizontal visual axis 40 ranges from 135° to 120° (an acute angle between the second electrode P2 and the horizontal visual axis 40 ranges from 45° to 60°). Specifically, the angle may be any one of 135°, 134°, 133°, 132°, 131°, 130°, 129°, 128°, 127°, 126°, 125°, 124°, 123°, 122°, 121°, or 120°.

An angle c between the third electrode P3 and the horizontal visual axis 40 ranges from 225° to 240° (an acute angle between the third electrode P3 and the horizontal visual axis 40 ranges from 45° to 60°). Specifically, the angle may be any one of 225°, 226°, 227°. 228°, 229°, 230°, 231°, 232°, 233°, 234°, 235°, 236°, 237°, 238°, 239°, or 240°.

An angle d between the fourth electrode P4 and the horizontal visual axis 40 ranges from 3150 to 3000 (an acute angle between the fourth electrode P4 and the horizontal visual axis 40 ranges from 45° to 60°). Specifically, the angle may be any one of 315°, 314°, 313°, 312°, 311°, 310°, 309°, 308°, 307°, 306°, 305°, 304°, 303°, 302°, 301°, or 300°.

In FIG. 4b, the second sub-pixel units 20 and the first sub-pixel units 10 have a same structure, and angles (a21, a22, a23, a24) are equal, which are not described here again.

In FIG. 4c, compared to the third angle α3 of the third branch electrodes 3012 of the third sub-pixel units 30, the first angle α1 of the first branch electrodes 1012 of the first sub-pixel units 10 is 5° greater than the second angle α2 of the second branch electrodes 2012 of the second pixel units 20.

In the third sub-pixel units 30, the third trunk electrode 3011 divides the first sub-pixel units 30 into four pixel domains, which are sequentially a first pixel domain A1, a second pixel domain A2, a third pixel domain A3, and a fourth pixel domain A4 in a counterclockwise order. The third branch electrodes 3012 in the four pixel domains are sequentially a first electrode P1, a second electrode P2, a third electrode P3, and a fourth electrode P4 in a counterclockwise order. The four electrodes respectively extend in four directions from an intersection of the first main trunk electrode 1011. The horizontal visual axis 40 is an X axis and a right extension direction of the horizontal visual axis 40 is a positive direction. An angle e between the first electrode P1 and the horizontal visual axis 40 ranges from 50° to 65° (an acute angle between the first electrode P1 and the horizontal visual axis 40 ranges from 55° to 65°). Specifically, the angle may be any one of 50°, 51°, 52°, 53°, 54°, 55°, 56°, 57° 58° 59° 60°, 61°, 62°, 63°, 64°, or 65°.

An angle f between the second electrode P2 and the horizontal visual axis 40 ranges from 130° to 115° (an acute angle between the second electrode P2 and the horizontal visual axis 40 ranges from 55° to 65°). Specifically, the angle may be any one of 130°, 129°, 128°, 127°, 126°, 125°, 124°, 123°, 122°, 121°, 120°, 119°, 118°, 117°, 116°, or 115°.

An angle g between the third electrode P3 and the horizontal visual axis 40 ranges from 230° to 245° (an acute angle between the third electrode P3 and the horizontal visual axis 40 ranges from 55° to 65°). Specifically, the angle may be any one of 230°, 231°, 232°. 233°, 234°, 235°, 236°, 237°, 238°, 239°, 240°, 241°, 242°, 243°, 244°, or 245°.

An angle h between the fourth electrode P4 and the horizontal visual axis 40 ranges from 310° to 290° (an acute angle between the fourth electrode P4 and the horizontal visual axis 40 ranges from 55° to 65°). Specifically, the angle may be any one of 310°, 309°, 308°, 307°, 306°, 305°, 304°, 303°, 302°, 301°, 300°, 299°, 298°, 297°, 296°, or 295°.

Specifically, in the above ranges, the set of the first angles may include 45°, 46°, 45°, and 46°, and the set of the second angles may include 45°, 46°, 45°, and 46°, and the set of the third angles may include 50°, 61°, 50°, and 61°.

Specifically, any one of the third angles α3 in the set of the third angles α3 is greater than any one of the first angles α1 in the set of the first angles α1. Any one of the third angles α3 in the set of the third angles α3 is greater than any one of the second angles α2 in the set of the second angles α2.

By disposing the four-domain structure, a color shading issue of the display panel viewed at vertical viewing angles can be solved. Therefore, in the array substrate, a light-shading area of an opaque part and a via hole of a thin-film transistor can be balanced. Aperture ratios of different domains of the pixel units can be equal. As such, a color shading issue can be solved to a certain extent no matter what angles the display panel is viewed at.

In one embodiment, the third angles α3 in the set of the third angles are a same, the second angles α2 in the set of the second angles are a same, and the first angles α1 in the set of the first angles are a same.

Specifically, angles in a set of the angles are a same (as shown in FIG. 4a, FIG. 4b, and FIG. 4c, branch electrodes of four domains of the first sub-pixel units 10, the second sub-pixel units 20, and the third sub-pixel units 30 are symmetrically arranged with respect to an intersection point of the first trunk electrode corresponding to the branch electrodes). That is, the set of the first angles includes 45°, 45°, 45°, and 45°, the set of the second angles includes 45°, 45°, 45°, and 45°, and the set of the third angles includes 50°, 50°, 50°, and 50°.

By making the third angles α3 in the set of the third angles equal, making the second angles α2 in the set of the second angles equal, and making the first angles α1 in the set of the first angles equal, branch electrodes disposed in the four pixel domains in a same pixel unit can be symmetrically arranged, which improves a display effect of the display panel In addition, an embodiment of the present disclosure further provides a mobile terminal. The mobile terminal includes any one of the array substrates mentioned in the above embodiments and a main terminal body. The main terminal body and the array substrate are integrated.

Experimental Examples evaluation standard
definition of color shading improvement:
a method of comparing a color saturation viewed from a lateral side to a color saturation viewed from a right front side:

$$Dc = C_{viewed\ from\ the\ lateral\ side} / C_{viewsed\ from\ the\ right\ front\ side}$$

$C_{viewed\ from\ the\ lateral\ side}$ is the color saturation viewed from the lateral side, and $C_{viewsed\ from\ the\ right\ front\ side}$ is the color saturation viewed from the right front side.

Based on a CIE1976L*a*b* color space (CIE LAB color space) color measurement system, color saturations of samples viewed at different viewing angles are observed.

$$C = \sqrt{(a^2 + b^2)}$$

C is a color saturation, and a is a red-green chromaticity. A value a being changed from positive to negative means that a color is changed from red (positive) to green (negative). b is a yellow-blue color chromaticity. A value b being changed from positive to negative means that a color is changed from yellow (positive) to blue (negative).

2. Observing Selected Display Samples

In the present disclosure, four skin tones (colors) are chosen to be standards to conduct a test. A display having a sub-pixel unit having a four-domain structure is taken as a test sample. Original data are obtained by calculating a ratio of a color saturation viewed from the lateral side to a color saturation viewed from the right front side.

Display grayscale values of the four tones of skin2, skin4, skin5, skin6, skin2, skin4, skin5, and skin6 are shown in Table 1.

TABLE 1

|  | R | G | B |
|---|---|---|---|
| Skin2 | 133 | 101 | 75 |
| Skin4 | 192 | 156 | 129 |
| Skin5 | 186 | 161 | 143 |
| Skin6 | 211 | 153 | 126 |

3. Blank Example, Embodiment, Comparative Example, and Results of Observation

Comparative example: a conventional method of solving a color shading issue. Specifically, acute angles between pixel electrodes of three types of R, G, B sub-pixel units and the horizontal visual axis 40 are 50°.

Blank example: a conventional design. Specifically, acute angles between pixel electrodes of three types of R, G, B sub-pixel units and the horizontal visual axis 40 are 45°.

Embodiment: one technical solution of the present disclosure. Specifically, acute angles between pixel electrodes of R and G sub-pixel units and the horizontal visual axis 40 are 50°, and acute angles between pixel electrodes of B sub-pixel units and the horizontal visual axis 40 is 55°.

TABLE 2

| | Skin2 | | | | | |
|---|---|---|---|---|---|---|
| | Dc | | | Dc improvement degree | | |
| observed angle | blank example | comparative example | embodiment | blank example | comparative example | embodiment |
| −60 | 0.6785 | 0.7032 | 0.7902 | 0.0000 | 0.0247 | 0.1117 |
| −45 | 0.7074 | 0.7399 | 0.8226 | 0.0000 | 0.0325 | 0.1152 |
| 0 | 1.0000 | 1.0000 | 1.0000 | 0.0000 | 0.0000 | 0.0000 |
| 45 | 0.7074 | 0.7399 | 0.8226 | 0.0000 | 0.0325 | 0.1152 |
| 60 | 0.6785 | 0.7032 | 0.7902 | 0.0000 | 0.0247 | 0.1117 |

TABLE 3

| | Skin4 | | | | | |
|---|---|---|---|---|---|---|
| | Dc | | | Dc improvement degree | | |
| observed angle | blank example | comparative example | embodiment | blank example | comparative example | embodiment |
| −60 | 0.7104 | 0.7328 | 0.8148 | 0.0000 | 0.0224 | 0.1044 |
| −45 | 0.7846 | 0.8088 | 0.8742 | 0.0000 | 0.0242 | 0.0896 |
| 0 | 1.0000 | 1.0000 | 1.0000 | 0.0000 | 0.0000 | 0.0000 |
| 45 | 0.7846 | 0.8088 | 0.8742 | 0.0000 | 0.0242 | 0.0896 |
| 60 | 0.7104 | 0.7328 | 0.8148 | 0.0000 | 0.0224 | 0.1044 |

TABLE 4

Skin5

| observed angle | Dc | | | Dc improvement degree | | |
|---|---|---|---|---|---|---|
| | blank example | comparative example | embodiment | blank example | comparative example | embodiment |
| −60 | 0.8114 | 0.8392 | 0.9882 | 0.0000 | 0.0278 | 0.1768 |
| −45 | 0.7506 | 0.7851 | 0.8978 | 0.0000 | 0.0345 | 0.1472 |
| 0 | 1.0000 | 1.0000 | 1.0000 | 0.0000 | 0.0000 | 0.0000 |
| 45 | 0.7506 | 0.7851 | 0.8978 | 0.0000 | 0.0345 | 0.1472 |
| 60 | 0.8114 | 0.8392 | 0.9882 | 0.0000 | 0.0278 | 0.1768 |

TABLE 5

Skin6

| observed angle | Dc | | | Dc improvement degree | | |
|---|---|---|---|---|---|---|
| | blank example | comparative example | embodiment | blank example | comparative example | embodiment |
| −60 | 0.4893 | 0.5084 | 0.5619 | 0.0000 | 0.0191 | 0.0727 |
| −45 | 0.5850 | 0.6109 | 0.6494 | 0.0000 | 0.0259 | 0.0644 |
| 0 | 1.0000 | 1.0000 | 1.0000 | 0.0000 | 0.0000 | 0.0000 |
| 45 | 0.5850 | 0.6109 | 0.6494 | 0.0000 | 0.0259 | 0.0644 |
| 60 | 0.4893 | 0.5084 | 0.5619 | 0.0000 | 0.0191 | 0.0727 |

According to Table 2, when a display color is skin2, compared to methods of simultaneously adjusting electrodes of R, G, and B sub-pixels, the embodiment of the present disclosure has a greater color shading improvement degree. The color shading improvement degree of the disclosure is 3 to 5 times a color shading improvement degree of the comparative example.

According to Table 3, when a display color is skin4, compared to methods of simultaneously adjusting electrodes of R, G, and B sub-pixels, the embodiment of the present disclosure has a greater color shading improvement degree. The color shading improvement degree of the disclosure is 3 to 4 times a color shading improvement degree of the comparative example.

According to Table 4, when a display color is skin5, compared to methods of simultaneously adjusting electrodes of R, G, and B sub-pixels, the embodiment of the present disclosure has a greater color shading improvement degree. The color shading improvement degree of the disclosure is 4 to 7 times a color shading improvement degree of the comparative example.

According to Table 5, when a display color is skin6, compared to methods of simultaneously adjusting electrodes of R, G, and B sub-pixels, the embodiment of the present disclosure has a greater color shading improvement degree. The color shading improvement degree of the disclosure is 2 to 4 times a color shading improvement degree of the comparative example.

In summary, the array substrate provided by the present disclosure includes the sub-pixel units having three different display colors. In a same display state, a grayscale value of the first sub-pixel unit 10, a grayscale value of the second sub-pixel unit 20, and a grayscale value of the third sub-pixel units 30 are different. An acute angle between the first electrode P1 of the first sub-pixel unit and a horizontal visual axis is a first angle $\alpha 1$, an acute angle between the second electrode P2 of the second sub-pixel unit and the horizontal visual axis is the second angle $\alpha 2$, and an acute angle between the third electrode P3 of the third sub-pixel unit and the horizontal visual axis is the third angle $\alpha 3$. The first angle $\alpha 1$ is controlled to be less than the third angle $\alpha 3$, the second angle $\alpha 2$ is controlled to be less than the third angle $\alpha 3$, and extension directions of electrodes of the three sub-pixel units are respectively adjusted. Therefore, a plurality of branch electrodes of the sub-pixel units having poor viewing angles can be targetedly adjusted as much as possible, thereby achieving a great improvement effect of luminescence of the sub-pixel units having three different display colors as well as optimizing vertical viewing angles of the sub-pixel units as much as possible. As such, a color shading degree can be adjusted, and a color shading issue of display panels viewed at vertical viewing angles can be solved.

It should be noted that many changes and modifications to the described embodiments can be carried out by those skilled in the art, and all such changes and modifications are intended to be included within the scope of the appended claims.

What is claimed is:

1. An array substrate, comprising:
    a plurality of sub-pixel units, wherein the sub-pixel units comprise a plurality of first sub-pixel units displaying a first color, a plurality of second sub-pixel units displaying a second color, and a plurality of third sub-pixel units displaying a third color, the first color, the second color, and the third color are different, a grayscale value of the first color and a grayscale value of the second color both are greater than a grayscale value of the third color in a same display state, wherein the display state is defined by an orientation of the array substrate for either a landscape mode display or a portrait mode display, wherein the grayscale value of the first color is determined by a structural angle of the first sub-pixel unit, the grayscale value of the second color is determined by a structural angle of the second sub-pixel unit, and the grayscale value of the third color is determined by a structural angle of the third sub-pixel unit, wherein when identical driving voltages are applied to the first, second and third sub-pixel units, a relationship between the grayscale values of the first, second, and third colors is maintained when the display is physically rotated between the landscape mode display and the portrait mode display, due to the structural angles of the first, second and third sub-pixel units;

the array substrate comprises a pair of short edges parallel to a horizontal visual axis and a pair of long edges vertical to the horizontal visual axis;

the first sub-pixel units comprise a first pixel electrode, the first pixel electrode comprises at least two first branch electrodes, the first branch electrodes extend along a first direction, an acute angle between the first direction and the horizontal visual axis is a first angle, and the first angle is the structural angle of the first sub-pixel unit;

the second sub-pixel units comprise a second pixel electrode, the second pixel electrode comprises at least two second branch electrodes, the second branch electrodes extend along a second direction, an acute angle between the second direction and the horizontal visual axis is a second angle, and the second angle is the structural angle of the second sub-pixel unit;

the third sub-pixel units comprise a third pixel electrode, the third pixel electrode comprises at least two third branch electrodes, the third branch electrodes extend along a third direction, an acute angle between the third direction and the horizontal visual axis is a third angle, and the third angle is the structural angle of the third sub-pixel unit; and the first angle is less than the third angle, and the second angle is less than the third angle in the same display state, wherein a difference between the first angle and the third angle is greater than 0.1° and is less than or equal to 10°, and a difference between the second angle and the third angle is greater than 0.1° and is less than or equal to 10°.

2. The array substrate of claim 1, wherein the first angle and the second angle are greater than or equal to 45°, and the third angle is greater than 45°.

3. The array substrate of claim 2, wherein the first angle and the second angle are less than or equal to 60°, and the third angle is less than or equal to 65°.

4. The array substrate of claim 1, wherein the difference between the first angle and the third angle is 5°, and the difference between the second angle and the third angle is 5°.

5. The array substrate of claim 1, wherein the first angle is equal to the second angle.

6. The array substrate of claim 1, wherein the first pixel electrodes comprise a first main stem electrode, the first main stem electrode is criss-cross-shaped, the first branch electrodes are connected to the first main stem electrode, each of the first sub-pixel units is divided into four pixel domains by the first main stem electrode, the first branch electrodes are separately disposed in the four pixel domains, the first branch electrodes disposed in the four pixel domains extend from an intersection center of the first main stem electrode in four different directions, and four acute angles between extension directions of the first branch electrodes disposed in the four pixel domains and the horizontal visual axis constitute a set of the plurality of first angles;

the second pixel electrodes comprise a second main stem electrode, the second main stem electrode is criss-cross-shaped, the second branch electrodes are connected to the second main stem electrode, each of the second sub-pixel units is divided into four pixel domains by the second main stem electrode, the second branch electrodes are separately disposed in the four pixel domains, the second branch electrodes disposed in the four pixel domains extend from an intersection center of the second main stem electrode in four different directions, and four acute angles between extension directions of the second branch electrodes disposed in the four pixel domains and the horizontal visual axis constitute a set of the plurality of second angles;

the third pixel electrodes comprise a third main stem electrode, the third main stem electrode is criss-cross-shaped, the third branch electrodes are connected to the third main stem electrode, each of the third sub-pixel units is divided into four pixel domains by the third main stem electrode, the third branch electrodes are separately disposed in the four pixel domains, the third branch electrodes disposed in the four pixel domains extend from an intersection center of the third main stem electrode in four different directions, and four acute angles between extension directions of the third branch electrodes disposed in the four pixel domains and the horizontal visual axis constitute a set of the plurality of third angles; and any one of the third angles in the set of the third angles is greater than any one of the first angles in the set of the first angles, and any one of the third angles in the set of the third angles is greater than any one of the second angles in the set of the second angles.

7. The array substrate of claim 6, wherein the third angles in the set of the third angles are equal, the second angles in the set of the second angles are equal, and the first angles in the set of the first angles are equal.

8. The array substrate of claim 7, wherein the third angles in the set of the third angles are 55°, the first angles in the set of the first angles and the second angles in the set of the second angles are 50°.

9. The array substrate of claim 1, wherein the first color and the second color comprise any one of red or green, and the third color comprises blue.

10. A mobile terminal, comprising an array substrate and a main terminal body, and the array substrate and the main terminal body are integrated;

wherein the array substrate comprises:
a plurality of sub-pixel units, wherein the sub-pixel units comprise a plurality of first sub-pixel units displaying a first color, a plurality of second sub-pixel units displaying a second color, and a plurality of third sub-pixel units displaying a third color, the first color, the second color, and the third color are different, a grayscale value of the first color and a grayscale value of the second color both are greater than a grayscale value of the third color in a same display state, wherein the display state is defined by an orientation of the array substrate for either a landscape mode display or a portrait mode display, wherein the grayscale value of the first color is determined by a structural angle of the first sub-pixel unit, the grayscale value of the second color is determined by a structural angle of the second sub-pixel unit, and the grayscale value of the third color is determined by a structural angle of the third sub-pixel unit, wherein when identical driving voltages are applied to the first, second and third sub-pixel units, a relationship between the grayscale values of the first, second, and third colors is maintained when the display is physically rotated between the landscape mode display and the portrait mode display, due to the structural angles of the first, second and third sub-pixel units;

the array substrate comprises a pair of short edges parallel to a horizontal visual axis and a pair of long edges vertical to the horizontal visual axis;

the first sub-pixel units comprise a first pixel electrode, the first pixel electrode comprises at least two first branch electrodes, the first branch electrodes extend along a first direction, an acute angle between the first direction and the horizontal visual axis is a first angle, and the first angle is the structural angle of the first sub-pixel unit;

the second sub-pixel units comprise a second pixel electrode, the second pixel electrode comprises at least two second branch electrodes, the second branch electrodes extend along a second direction, an acute angle between the second direction and the horizontal visual axis is a second angle, and the second angle is the structural angle of the second sub-pixel unit;

the third sub-pixel units comprise a third pixel electrode, the third pixel electrode comprises at least two third branch electrodes, the third branch electrodes extend along a third direction, an acute angle between the third direction and the horizontal visual axis is a third angle, and the third angle is the structural angle of the third sub-pixel unit; and wherein the first angle is less than the third angle, and the second angle is less than the third angle in the same display state, wherein a difference between the first angle and the third angle is greater than 0.1° and is less than or equal to 10°, and a difference between the second angle and the third angle is greater than 0.1° and is less than or equal to 10°.

11. The mobile terminal of claim 10, wherein the first angle and the second angle are greater than or equal to 45°, and the third angle is greater than 45°.

12. The mobile terminal of claim 11, wherein the first angle and the second angle are less than or equal to 60°, and the third angle is less than or equal to 65°.

13. The mobile terminal of claim 10, wherein the difference between the first angle and the third angle is 5°, and the difference between the second angle and the third angle is 5°.

14. The mobile terminal of claim 10, wherein the first angle is equal to the second angle.

15. The mobile terminal of claim 10, wherein the first pixel electrodes comprise a first main stem electrode, the first main stem electrode is criss-cross-shaped, the first branch electrodes are connected to the first main stem electrode, each of the first sub-pixel units is divided into four pixel domains by the first main stem electrode, the first branch electrodes are separately disposed in the four pixel domains, the first branch electrodes disposed in the four pixel domains extend from an intersection center of the first main stem electrode in four different directions, and four acute angles between extension directions of the first branch electrodes disposed in the four pixel domains and the horizontal visual axis constitute a set of first angles;

the second pixel electrodes comprise a second main stem electrode, the second main stem electrode is criss-cross-shaped, the second branch electrodes are connected to the second main stem electrode, each of the second sub-pixel units is divided into four pixel domains by the second main stem electrode, the second branch electrodes are separately disposed in the four pixel domains, the second branch electrodes disposed in the four pixel domains extend from an intersection center of the second main stem electrode in four different directions, and four acute angles between extension directions of the second branch electrodes disposed in the four pixel domains and the horizontal visual axis constitute a set of second angles;

the third pixel electrodes comprise a third main stem electrode, the third main stem electrode is criss-cross-shaped, the third branch electrodes are connected to the third main stem electrode, each of the third sub-pixel units is divided into four pixel domains by the third main stem electrode, the third branch electrodes are separately disposed in the four pixel domains, the third branch electrodes disposed in the four pixel domains extend from an intersection center of the third main stem electrode in four different directions, and four acute angles between extension directions of the third branch electrodes disposed in the four pixel domains and the horizontal visual axis constitute a set of third angles; and any one of the third angles in the set of the third angles is greater than any one of the first angles in the set of the first angles, and any one of the third angles in the set of the third angles is greater than any one of the second angles in the set of the second angles.

16. The mobile terminal of claim 15, wherein the third angles in the set of the third angles are equal, the second angles in the set of the second angles are equal, and the first angles in the set of the first angles are equal.

17. The mobile terminal of claim 16, wherein the third angles in the set of the third angles are 55°, the first angles in the set of the first angles and the second angles in the set of the second angles are 50°.

18. The mobile terminal of claim 10, wherein the first color and the second color comprise any one of red or green, and the third color comprises blue.

* * * * *